United States Patent
Chirca et al.

(10) Patent No.: US 9,465,741 B2
(45) Date of Patent: Oct. 11, 2016

(54) MULTI PROCESSOR MULTI DOMAIN CONVERSION BRIDGE WITH OUT OF ORDER RETURN BUFFERING

(71) Applicant: Texas Instruments Incorporated, Dallas, TX (US)

(72) Inventors: Kai Chirca, Dallas, TX (US); Daniel B Wu, Dallas, TX (US); Matthew D Pierson, Murphy, TX (US); Timothy D. Anderson, University Park, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 409 days.

(21) Appl. No.: 14/056,729

(22) Filed: Oct. 17, 2013

(65) Prior Publication Data
US 2014/0115210 A1    Apr. 24, 2014

Related U.S. Application Data

(60) Provisional application No. 61/717,823, filed on Oct. 24, 2012.

(51) Int. Cl.
*G06F 13/40* (2006.01)
*G06F 12/08* (2016.01)
*G06F 13/16* (2006.01)

(52) U.S. Cl.
CPC ....... *G06F 12/0831* (2013.01); *G06F 12/0815* (2013.01); *G06F 13/1689* (2013.01); *G06F 13/4013* (2013.01); *G06F 13/4027* (2013.01); *G06F 2212/6042* (2013.01); *G06F 2212/621* (2013.01)

(58) Field of Classification Search
CPC .................. G06F 13/4013; G06F 13/4027
See application file for complete search history.

(56) References Cited

U.S. PATENT DOCUMENTS

| | | | | |
|---|---|---|---|---|
| 5,627,975 A * | 5/1997 | Bryant | ............... | G06F 13/4013 710/307 |
| 5,642,501 A * | 6/1997 | Doshi | ............... | G06F 17/30067 707/613 |
| 6,442,641 B1 * | 8/2002 | Bury | ................... | G06F 13/4027 710/305 |
| 6,757,762 B1 * | 6/2004 | McCarthy | ........... | G06F 13/4059 710/105 |
| 8,244,950 B2 * | 8/2012 | Barth | .................. | G06F 13/4059 710/306 |
| 8,489,791 B2 * | 7/2013 | Byrne | ................ | G06F 13/4059 710/306 |
| 8,595,452 B1 * | 11/2013 | Katzer | ................. | G06F 3/0607 707/619 |
| 8,667,195 B2 * | 3/2014 | Jeong | .................... | G06F 13/14 710/107 |
| 9,152,586 B2 * | 10/2015 | Wu | ..................... | G06F 13/1689 |
| 9,183,170 B2 * | 11/2015 | Jeong | ................... | G06F 13/405 |
| 9,201,829 B2 * | 12/2015 | Yu | ....................... | G06F 13/4027 |
| 2005/0273536 A1 * | 12/2005 | Mathewson | ........ | G06F 13/4059 710/110 |
| 2008/0028197 A1 * | 1/2008 | Sawai | .................... | G06F 13/28 712/300 |
| 2014/0115220 A1 * | 4/2014 | Wu | ..................... | G06F 13/1689 710/306 |
| 2014/0115270 A1 * | 4/2014 | Wu | ..................... | G06F 13/1689 711/146 |

* cited by examiner

*Primary Examiner* — Brian Misiura
(74) *Attorney, Agent, or Firm* — Robert D. Marshall, Jr.; Frank D. Cimino

(57) ABSTRACT

An asynchronous dual domain bridge is implemented between the cache coherent master and the coherent system interconnect. The bridge has 2 halves, one in each clock/powerdown domain—master and interconnect. The asynchronous bridge is aware of the bus protocols used by each individual processor within the attached subsystem, and can perform the appropriate protocol conversion on each processor's transactions to adapt the transaction to/from the bus protocol used by the interconnect.

3 Claims, 1 Drawing Sheet

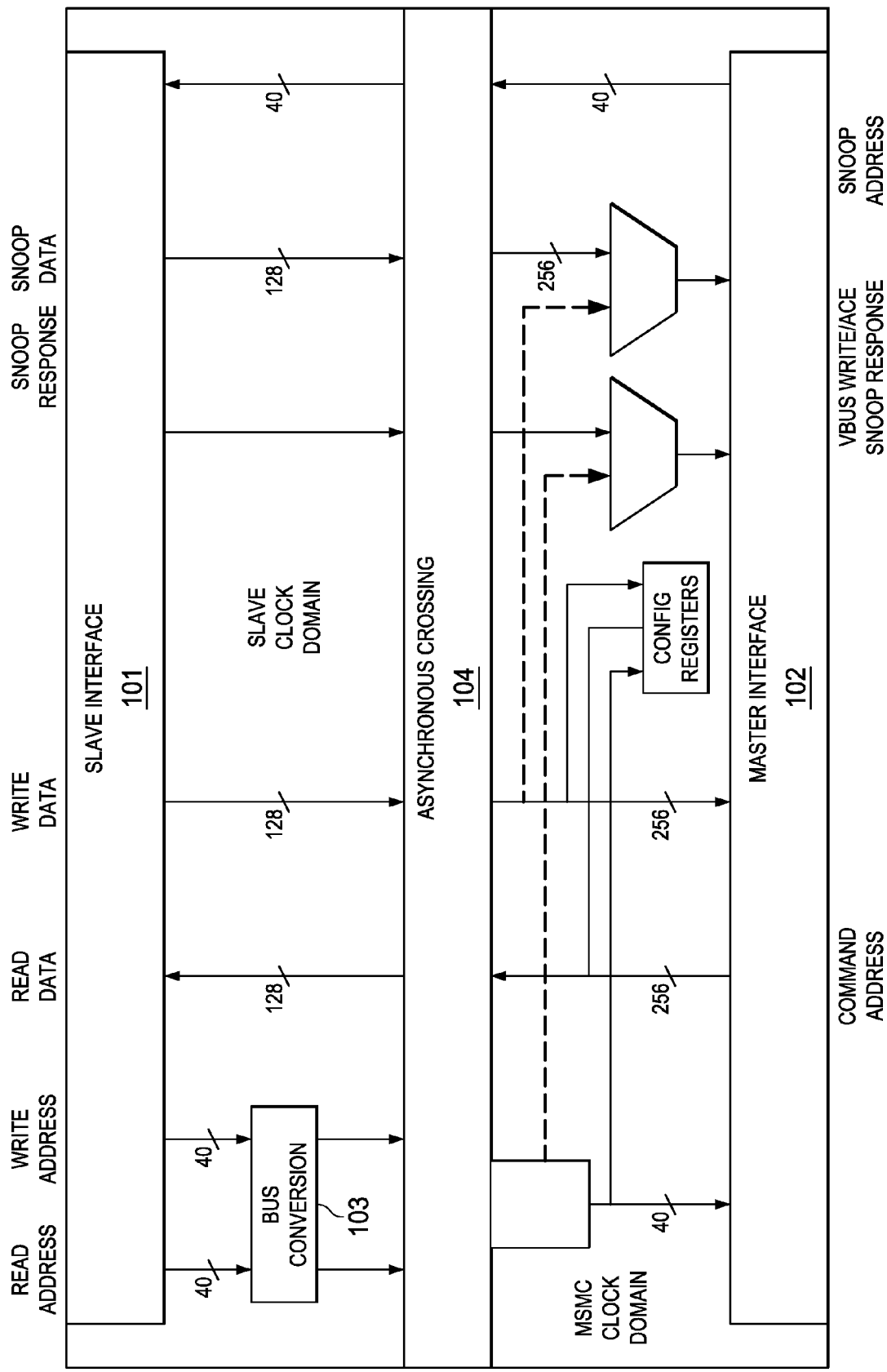

MULTI PROCESSOR MULTI DOMAIN CONVERSION BRIDGE WITH OUT OF ORDER RETURN BUFFERING

CLAIM OF PRIORITY

This application claims priority under 35 U.S.C. 119(e)(1) to Provisional Application No. 61/717,823 filed 24 Oct. 2012.

TECHNICAL FIELD OF THE INVENTION

The technical field of this invention is interprocessor communications.

BACKGROUND OF THE INVENTION

In today's large System on Chips (SOCs) that contain multiple compute cores, the cores can be running on different power domains (thus on separate PLLs) in order to gain full clock speed entitlement. However, there may be times when some of this compute power isn't necessary and could be powered down in order to reduce the overall power consumption of the device.

If the unit being powered down is a cache coherent master in a cache coherent interconnect system, the transition of the master into a fully powered down non-responsive state needs to be well understood by the rest of the system and the interconnect. With regards to snoop transactions, the power down transition needs to ensure that hang situations are avoided:

1) snoop transactions may be dropped because the interconnect has already sent snoop transactions to the master before the interconnect has knowledge that the master is powering down,
2) snoop responses may be dropped by the master if the power down mechanism doesn't anticipate that snoop transactions are still in the process of being serviced and simply powers down.

Memory Endian has typical been viewed as a Chip-Wide state. The entire chip has a single memory view that is aligned across all components in the system. As more individual processor cores have been added over time to make System on Chips (SOCs), where processors are individually attached to an interconnect and can each be running different code, the need for multi-endian views of the system memory has become necessary.

In a large scale System on Chip, the integration of multiple processors in a high performance device poses many additional challenges:

How to effectively integrate processors that support different protocols?

How to gain full processor performance and speed entitlement?

How to gain full code execution entitlement when there are multiple cores within a processor?

How to maintain memory coherency and synchronization between processors?

How to handle coherency when a processor is powered-down?

SUMMARY OF THE INVENTION

An asynchronous dual domain bridge is implemented between the cache coherent master and the coherent system interconnect. The bridge has 2 halves, one in each domain—master and interconnect. The asynchronous bridge described in this invention is operable to convert the differing bus protocols of the interconnect and of the devices attached to the master and slave interfaces of the asynchronous bridge.

BRIEF DESCRIPTION OF THE DRAWINGS

These and other aspects of this invention are illustrated in the drawings, in which:

FIG. 1 shows a block diagram of the dual-domain bridge.

DETAILED DESCRIPTION OF PREFERRED EMBODIMENTS

FIG. 1 shows an implementation of the asynchronous bridge operable to bridge different domains. Slave interface 101, operating in the slave domain is bridged to the master interface 102 operating in the Multicore Shared Memory Controller (MSMC) domain through asynchronous crossing 104. Since differences in data path width and memory endian may exist between the master and slave interfaces, bus width and endian conversion is performed in bus conversion block 103 as needed. Data and requests are transferred asynchronously between both halves using FIFOs appropriately sized to prevent any throughput issues.

The powerdown procedure implemented in the bridge is the following:

1) The cache coherent master subsystem produces a powerdown request signal, which propagates to the interconnect power domain portion of the bridge,
2) The bridge detects this and temporarily stops accepting snoop transactions from the coherent interconnect,
3) The bridge then waits for all already in-flight snoop commands to be drained by auto responding to them since the coherent master will have already drained out its caches by this point. The bridge does this by internally score boarding all snoop transactions as they are accepted from the interconnect. If the master does happen to send any snoop responses at this point, they are accepted and dropped by the bridge as the master cache is clean/empty at this point (i.e the expected master snoop response is already known),
4) Once all in-flight snoop commands have been responded to the interconnect, the bridge sends the powerdown acknowledgement signal back across to the cache coherent master subsystem and simultaneously gates off all asynchronous transfer logic to prevent spurious signaling during the actual power gating/isolation transition,
5) Once the powerdown acknowledgement signal is sent, the bridge begins its auto snoop response mode where it generates "normal—no data" snoop responses for snoop commands from the interconnect.
6) For powerup, once the interconnect domain of the bridge detects a reset de-assertion transition from the cache coherent master subsystem domain, the bridge stops this auto snoop response mode and returns to its normal mode of passing snoop commands onto the attached cache coherent master and passing back the master's snoop response onto the coherent system interconnect.
7) Similarly, when the entire device/system-interconnect powers up and comes out of reset, but the master is held in reset and possibly powered down without going into a functional non-reset mode, the bridge detects this and enters its auto snoop response mode immediately upon the interconnect domain coming out of reset.

This solution provides a very simplistic approach to the powerdown of a cache coherent master in a coherent interconnect system that eliminates the need to make the interconnect aware of the powerdown mode the cache coherent master is about to enter. Having to make the interconnect aware of the master powering down, requires either that the interconnect has to resolve in-flight snoop transactions already sent before the interconnect has observed the powerdown hint from the master or that the master has to be able to service all snoop responses even during the powerdown sequence.

The described solution allows the interconnect to be simplified by never having to comprehend the powerdown nature of the cache coherent master and having the guarantee that snoop transactions will always be responded to. The master can also be simplified knowing that it can safely powerdown irrespective of whether there are still snoop transactions being serviced by its logic.

Lastly, on powerup, the interconnect and master do not need to share any powerup information between them, the bridge seamlessly transitioning back to the snoop transaction pass through mode when it detects that the master has powered-up and comes out of reset.

Memory Endian has typically been viewed as a Chip-Wide state. The entire chip has a single memory view that is aligned across all components in the system. As more individual processor cores have been added over time to make System on Chips (SOCs), where processors are individually attached to an interconnect and can each be running different code, the need for multi-endian views of the system memory has become necessary. In the next evolution, multiple processors are now bundled into a subsystem which acts as a single master connected to the interconnect. The subsystem typically has a shared memory controller entity which unifies the memory traffic into a single interface that attaches to the system interconnect. While an interconnect can be expected to support multiple masters with different endian memory views of the system, this doesn't inherently support the use-model where multiple processors with different memory endian views are attached to the interconnect through the same shared master interface. Each processor in the subsystem can potentially be running their own application and thus are not required to all have the same memory endian view.

The solution to the problem as described in this invention is to add a bridge between the subsystem and the interconnect which is aware of the number of processors within the subsystem. The bridge is aware of the current endian view used by each individual processor within the attached subsystem and can perform the appropriate endian conversion on each processor's individual transactions to adapt the transaction to/from the endian view used by the interconnect/system.

The implementation uses endian-invariant memory mapped registers (MMRs) to allow each processor within the subsystem (regardless of their current endian view) to program the bridge to be aware of the processor's current endian view. Another potential implementation would be to provide a signal from the processor which could convey the processor's current endian view.

This solution allows processors within the subsystem to have different endian views of the system memory and thus allowing each processor's thread/OS/application to have the full entitlement since its endian view can be independent of the view of the other processors within the subsystem. Full entitlement can be among other things - not having to modify code for endian related conversions thus gaining full processor execution entitlement, or taking advantage of platform specific behavior which may benefit certain endian views, or providing the flexibility to allow the code developer to choose which ever endian mode they are most familiar with. This solution allows all processors within a subsystem to have full entitlement since they can individually choose their endian view independent of the endian view used by the other processors within the same subsystem.

The asynchronous bridge maintains an endian-independent view of MMR space by swapping the bytes within a word when the slave CPU is big endian to return to the little endian view of an MMR word and also word swapping when MSMC is big endian to move the MMR word into the correct byte lanes as shown in Table 1.

| Non-MMR space | | | | |
|---|---|---|---|---|
| | Eagle (seen on EN slave AXI port) | | MSMC (seen on EN Master VBusM port) | |
| Instruction - no change | LE | 15 14 13 12 11 10 9 8 7 6 5 4 3 2 1 0<br>31 30 29 28 27 26 25 24 23 22 21 20 19 18 17 16 | DP1<br>DP2 →EN→ | LE | 31 30 29 28 - 27 26 25 24 - 23 22 21 20 - 19 18 17 16 - 15 14 13 12 - 11 10 9 8 - 7 6 5 4 - 3 2 1 0 |
| CPU data 32b reg  3210 | LE | 15 14 13 12 11 10 9 8 7 6 5 4 3 2 1 0<br>31 30 29 28 27 26 25 24 23 22 21 20 19 18 17 16 | | BE | 0 1 2 3 - 4 5 6 7 - 8 9 10 11 - 12 13 14 15 - 16 17 18 19 - 20 21 22 23 - 24 25 26 27 - 28 29 30 31 |
| Instruction - no change | BE | 15 14 13 12 11 10 9 8 7 6 5 4 3 2 1 0<br>31 30 29 28 27 26 25 24 23 22 21 20 19 18 17 16 | | LE | 31 30 29 28 - 27 26 25 24 - 23 22 21 20 - 19 18 17 16 - 15 14 13 12 - 11 10 9 8 - 7 6 5 4 - 3 2 1 0 |
| CPU data 32b reg  0123 | BE | 15 14 13 12 11 10 9 8 7 6 5 4 3 2 1 0<br>31 30 29 28 27 26 25 24 23 22 21 20 19 18 17 16 | | BE | 0 1 2 3 - 4 5 6 7 - 8 9 10 11 - 12 13 14 15 - 16 17 18 19 - 20 21 22 23 - 24 25 26 27 - 28 29 30 31 |
| MMR space | | | | |

-continued

| Eagle CPU view | Eagle (seen on EN slave AXI port) | ⇕ EN | MSMC (seen on EN Master VBusM port) |
|---|---|---|---|
| CPU data 32b reg  [3 2 1 0] | LE  15 [15 14 13 12 11 10 9 8 7 6 5 4 3 2 1 0 / 31 30 29 28 27 26 25 24 23 22 21 20 19 18 17 16] 0 | | LE  31 [31 30 29 28 - 27 26 25 24 - 23 22 21 20 - 19 18 17 16 - 15 14 13 12 - 11 10 9 8 - 7 6 5 4 - 3 2 1 0] 0 |
| | LE  15 [15 14 13 12 11 10 9 8 7 6 5 4 3 2 1 0 / 31 30 29 28 27 26 25 24 23 22 21 20 19 18 17 16] 0 | | BE  31 [3 2 1 0 - 7 6 5 4 - 11 10 9 8 - 15 14 13 12 - 19 18 17 16 - 23 22 21 20 - 27 26 25 24 - 31 30 29 28] 0 |
| CPU data 32b reg  [3 2 1 0] | BE  15 [15 14 13 12 11 10 9 8 7 6 5 4 3 2 1 0 / 31 30 29 28 27 26 25 24 23 22 21 20 19 18 17 16] 0 | | LE  31 [31 30 29 28 - 27 26 25 24 - 23 22 21 20 - 19 18 17 16 - 15 14 13 12 - 11 10 9 8 - 7 6 5 4 - 3 2 1 0] 0 |
| | BE  15 [15 14 13 12 11 10 9 8 7 6 5 4 3 2 1 0 / 31 30 29 28 27 26 25 24 23 22 21 20 19 18 17 16] 0 | | BE  31 [3 2 1 0 - 7 6 5 4 - 11 10 9 8 - 15 14 13 12 - 19 18 17 16 - 23 22 21 20 - 27 26 25 24 - 31 30 29 28] 0 |

The asynchronous bridge also converts transactions from the processor's bus protocol into the bus protocol used by the interconnect and vice versa for return responses. The bridge provides support for a multi-core processor by allowing core-specific management of endian mode, privilege ID, and master ID.

For synchronization, the bridge handles barrier transactions and provides a loop-back mode for virtual message transactions, thereby not exposing them to the interconnect if they are not supported or required. A barrier transaction is a transaction that has the property that any transactions that it controls must not be reordered with respect to it. Thus, it can be inserted into a stream of transaction requests to maintain the order of the transactions it controls and thereby prevent some transactions from being performed before others.

For coherency, the bridge supports separating read/write transactions from the processor into blocking and non-block channels for a cache coherent interconnect. For snoop traffic, the bridge provides pass through channels for snoop transaction/responses/data. The bridge also supports efficient cache ownership transfers by giving ownership transfer request hints to the interconnect and out-of-order ownership transfer completion signaling information.

The bridge has buffering resources to support the full issuing capacity of the multi-core processor and thus allow efficient out-of-order responses from the interconnect. The bridge reorders the responses to match the processor's specific ordering requirements while making optimizations to improve cache transaction performance.

The following are some of the advantages realized by the asynchronous bridge of this invention:

1) Bridging across 2 power/clock domains allows for full speed entitlement for both the processor and the interconnect. This also provides the flexibility to run each processor at a lower or higher power/performance level when necessary.
2) Having core-specific identification, endian behavior gives greater flexibility and independency to each core's software.
3) The synchronization support isolates barriers (and virtual messages when necessary) from the interconnect, thereby simplifying the interconnect design. If the interconnect natively lacks this support, our solution enables system barriers support (and mimics support for virtual messages) for the attached master. This allows software that takes advantage of these features to easily migrate to a system where the interconnect does provide native support.
4) The coherency support also simplifies the interconnect design by having the bridge handle the processor transaction repartitioning between block and non-block channels. The ownership transfer request hints and the transaction ownership retire information allow the interconnect to more efficiently allocate its transaction tracking resources.
5) The return buffering capacity allows the bridge to never stall any of the return interfaces from the interconnect since the bridge has sufficient capacity to match the processor's issuing capacity. This allows the interconnect to be simplified and return responses out-of-order and as soon as possible. The bridge is aware of the allowable re-ordering of responses to the master and takes advantage of this to re-order responses in an efficient manner that minimizes false inter-transactional dependencies that would introduce unnecessary additional latency on return responses.
6) The bridge's powerdown support isolates the processor powerdown and powerup from the interconnect. The bridge manages the transitions in a seamless fashion that simplifies otherwise complex issues of properly handling snoop transactions during a powerdown sequence without dropping snoop transactions/responses that could potentially hanging either the processor being powering down and/or the coherent system interconnect.

What is claimed is:

1. An asynchronous bus protocol conversion bridge operable to connect a plurality of domains, consisting of:
    a slave interface operable within a slave domain,
    a slave processor or a slave plurality of processors connected to said slave interface, each slave processor having a corresponding power domain, clock domain and endian data format,
    a master interface operable within a master domain,
    a master processor or a plurality of master processors connected to said master interface, each master processor having a corresponding power domain, clock domain and endian data format, and
    an asynchronous crossing connected to said slave interface and said master interface operable to
        bridge across a plurality of power and clock domains,
        bridge between core-specific endian data format,
        provide synchronization support to isolate barriers from an interconnect,
        provide system barrier support for interconnects lacking such support,
        provide coherency support by implementing processor transaction repartitioning between blocking and non blocking channels,
        provide ownership transfer request notifications and ownership retire information thus allowing the interconnect to optimize its transaction tracking resources,
        provide return buffering capacity to prevent stalling of the return interfaces,
        re-order responses in an efficient manner that minimizes inter-transaction dependencies and additional latencies,
        provide power down support that isolates the processor's powerdown and powerup from the interconnect, thus enabling proper execution of snoop transactions.

2. The asynchronous bus protocol conversion bridge of claim 1 wherein:
    one or more of the processors connected to said master interface implements a bus protocol that is different than the bus protocol of the processors connected to said slave interface.

3. The asynchronous bus protocol conversion bridge of claim 1 wherein:
    the asynchronous crossing is further operable to reorder responses to match a processor's specific ordering requirements and is further operable to making optimizations to improve transaction performance.

* * * * *